Figure 1:
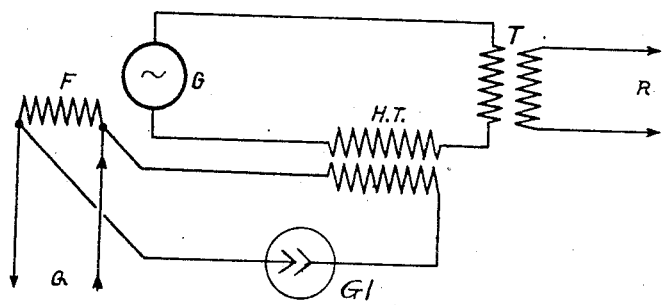

Nov. 4, 1924.

W. SCHÄFFER 1,514,231

CONTROLLING ALTERNATOR FOR SUPPLYING TUBE TRANSMITTERS

Filed May 3, 1922

Inventor:
Walter Schäffer

Patented Nov. 4, 1924.

1,514,231

UNITED STATES PATENT OFFICE.

WALTER SCHÄFFER, OF BERLIN, GERMANY, ASSIGNOR TO GESELLSCHAFT FÜR DRAHTLOSE TELEGRAPHIE M. B. H. HALLESCHES, OF BERLIN, GERMANY, A CORPORATION OF GERMANY.

CONTROLLING ALTERNATOR FOR SUPPLYING TUBE TRANSMITTERS.

Application filed May 3, 1922. Serial No. 558,306.

*To all whom it may concern:*

Be it known that I, WALTER SCHÄFFER, a citizen of the Republic of Germany, and a resident of Hallesches Ufer 12/13, Berlin, S. W. 11, Germany, have invented new and useful Improvements in Controlling Alternators for Supplying Tube Transmitters, an application for which was filed in Germany April 15, 1921, of which the following is a specification accompanied by drawings.

My present invention relates to an arrangement for controlling alternators such, for example, as those used for supplying vacuum tube transmitters. The method is one by which the field of an alternator is automatically influenced by the load, so that when the output is greatly altered, for instance, from full-load to no-load work, as when the grid key of a vacuum tube transmitter is opened, the voltage of the tube is not increased to any great extent.

Figure 2:
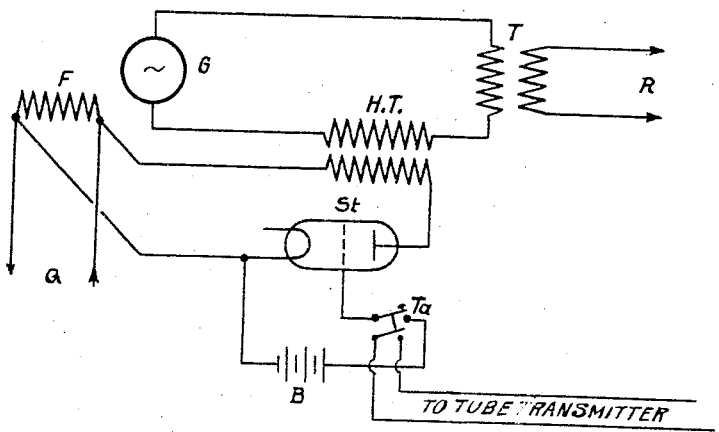

In the drawing,

Fig. 1 is a diagrammatic representation of a circuit arrangement embodying the invention, and Fig. 2 is a diagrammatic representation of a modified form of circuit arrangement also embodying the invention.

As shown in Fig. 1 the primary of an auxiliary transformer H T, the secondary winding of which contains a rectifier Gl, is included in the alternating current circuit which contains the generator G and the main transformer T. The secondary winding of the transformer T supplies current to the vacuum transmitters through the circuit R. The alternator G is made of laminated iron so that the electrical inertia of its field F is made as small as possible. The field F is simultaneously provided with current from a constant direct current source Q and with direct current coming from the rectifier Gl. When the load on the circuit R is removed as, for instance, by opening the grid key of a tube transmitter so that no oscillations are generated by the tube, the output withdrawn from the chief transformer T is instantly diminished, and at the same time the direct current coming from the auxiliary transformer H T is reduced. Thereby the field F is weakened and with it the terminal voltage of the generator.

Instead of inserting a simple rectifier into the alternating current circuit, it may be desirable to choose one with a controlling grid, for example, a high power amplifying tube St, such as is shown in Fig. 2. In this case the grid of the rectifier can be controlled in any manner desired, for instance, by a key Ta. The grid and cathode of the tube St are connected by a battery B. The circuit of the battery B can be closed by the key Ta synchronously with the closing of the key of the tube transmitter. In this way an amplification of the regulating effect produced by the rectifier is obtained which can be so far increased as not only to prevent a rise of the anode voltage but even to cause the voltage to be diminished when the output alters with decrease in the load. Under certain circumstances this arrangement is important, for instance, when too large losses occur owing to an excessively high current when the tube is working on no load. By decreasing the anode voltage the permanent current is reduced and these losses are obviated. Finally it is also possible to employ a telephone transmitter T in place of the key Ta, so that speech potential may be applied simultaneously on the grids of the transmitting tube and of the tube St.

Having described my invention, what I claim is:

1. In an arrangement of the class described, an alternating frequency generator, a transformer having its primary arranged in circuit with the generator, a combined rectifier and amplifier arranged in series with the secondary of the transformer, and connections between the rectifier circuit and the field of the generator for varying the intensity of the field upon changes in the load on the generator.

2. In an arrangement of the class described, an alternating frequency generator, a transformer having its primary arranged in circuit with the generator, a combined rectifier and amplifier arranged in series with the secondary of the transformer, means separate from the transformer for supplying current to the field of the generator and connections between the rectifier circuit and the field of the generator for varying the intensity of the field upon changes in the load on the generator.

3. In an arrangement of the class described, an alternating frequency generator, a transformer having its primary arranged in circuit with the generator, a combined rectifier and amplifier arranged in series with the secondary of the transformer and connections between the rectifier circuit and the field of the generator for varying the intensity of the field upon changes in the load on the generator, said combined rectifier and amplifier being in the form of a three-element vacuum tube so that the degree of excitation of the field of the generator by the rectifier circuit can be controlled by small energies impressed on the grid of said tube.

4. In an arrangement of the class described, an alternating current generator, a transformer having its primary in circuit with said generator, a circuit containing the secondary of said transformer and a combined rectifier and amplifier, connections between said circuit and the field of the generator, and means for varying the degree of excitation of said field by varying the degree of amplification synchronously with varying the load on said generator.

5. In an arrangement for controlling an alternating frequency generator for supplying a vacuum tube transmitter, a transmitter, a transformer having its primary arranged in circuit with the generator, a three-element vacuum tube having its plate and filament connected in series with the secondary of the transformer, connections between the circuit of the secondary of the transformer and the field of the generator, and means for synchronously controlling the grid circuits of said three-element vacuum tube and the tube transmitter for varying the intensity of the field of the generator upon changes in the load on the generator resulting from changes in the grid circuit of the tube transmitter.

6. In an arrangement for controlling an alternating frequency generator for supplying a vacuum tube transmitter, a transformer having its primary arranged in circuit with the generator, a three-element vacuum tube connected in series with the secondary of the transformer, connections between the circuit of the secondary of the transformer and the field of the generator, and means for synchronously controlling said vacuum tube and the tube transmitter so as to vary the intensity of the field of the generator upon changes in the load on the generator resulting from changes in the amount of current consumed by the tube transmitter.

7. In an arrangement for controlling an alternating frequency generator for supplying a vacuum tube transmitter, a transformer having its primary arranged in circuit with the generator, a three-element vacuum tube having its plate and filament connected in series with the secondary of the transformer, connections between the circuit of the secondary of the transformer and the field of the generator, and key devices for synchronously opening and closing the grid circuits of said three-element vacuum tube and the tube transmitter so as to vary the intensity of the field of the generator upon changes in the load on the generator resulting from the opening and closing of the grid circuit of the tube transmitter.

In testimony whereof I affix my signature in the presence of two witnesses.

WALTER SCHÄFFER.

Witnesses:
 MAX M. ABRAHAMSOHN,
 ERNST WILKE.